(12) United States Patent
Lavature et al.

(10) Patent No.: US 7,501,169 B2
(45) Date of Patent: Mar. 10, 2009

(54) TRANSLUCENT FLAME RETARDANT TAPE

(75) Inventors: Adalbert E. Lavature, Huntington, MA (US); Robert Covey, Branford, CT (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 11/190,414

(22) Filed: Jul. 27, 2005

(65) Prior Publication Data
US 2007/0026180 A1    Feb. 1, 2007

(51) Int. Cl.
*B32B 9/00*     (2006.01)
*B32B 7/12*     (2006.01)

(52) U.S. Cl. .................. 428/40.1; 428/343; 428/906

(58) Field of Classification Search ................ 428/40.1, 428/343, 906
See application file for complete search history.

(56) References Cited

U.S. PATENT DOCUMENTS

| | | | |
|---|---|---|---|
| 4,005,247 A | | 1/1977 | Graham |
| 4,900,624 A | | 2/1990 | Chen |
| 5,412,014 A | * | 5/1995 | Romenesko ................ 524/416 |
| 5,807,637 A | | 9/1998 | Schumann et al. |
| 6,114,426 A | | 9/2000 | Burack et al. |
| 6,355,344 B1 | | 3/2002 | Mamish et al. |
| 6,652,963 B2 | | 11/2003 | Husemann et al. |
| 6,726,971 B1 | | 4/2004 | Wong |
| 6,844,391 B1 | | 1/2005 | Iyer et al. |
| 2003/0031874 A1 | | 2/2003 | Valinski et al. |
| 2005/0123769 A1 | * | 6/2005 | Shively et al. ........... 428/423.1 |

FOREIGN PATENT DOCUMENTS

JP    2003-260763    9/2003

OTHER PUBLICATIONS

Deerfield Urethane, Dureflex(R) Elstomeric Film and Shet Product data, Bayer MaterialScience, http://www.deerfieldurethane.com/aromatic_polyester_tpu_film_sheet_datasheet.pdf   date unknown.
Form PCT/ISA/220, "Notification of Transmittal of . . . " for PCT/US2007/000672, mailed Oct. 11, 2007 (3 pg.).
Form PCT/ISA/237, "Written Opinion of the International Searching Authority" for PCT/US2007/000672 mailed Oct. 11, 2007 (12 pgs.).
Form PCT/ISA/210, "International Search Report" for PCT/US2007/000672 mailed Oct. 11, 2007 (6 pgs.).

* cited by examiner

*Primary Examiner*—Patricia L Nordmeyer
(74) *Attorney, Agent, or Firm*—Maldjian & Fallon LLC; Jon Fallon, Esq.; John P. Maldjian, Esq.

(57) ABSTRACT

The present invention relates to an adhesive film composite, uses of an adhesive film composite and a method for applying an adhesive film composite. The adhesive film composite may include a substrate and an adhesive disposed on the substrate. The adhesive film composite may be a substantially translucent, flame retardant adhesive composite.

36 Claims, 2 Drawing Sheets

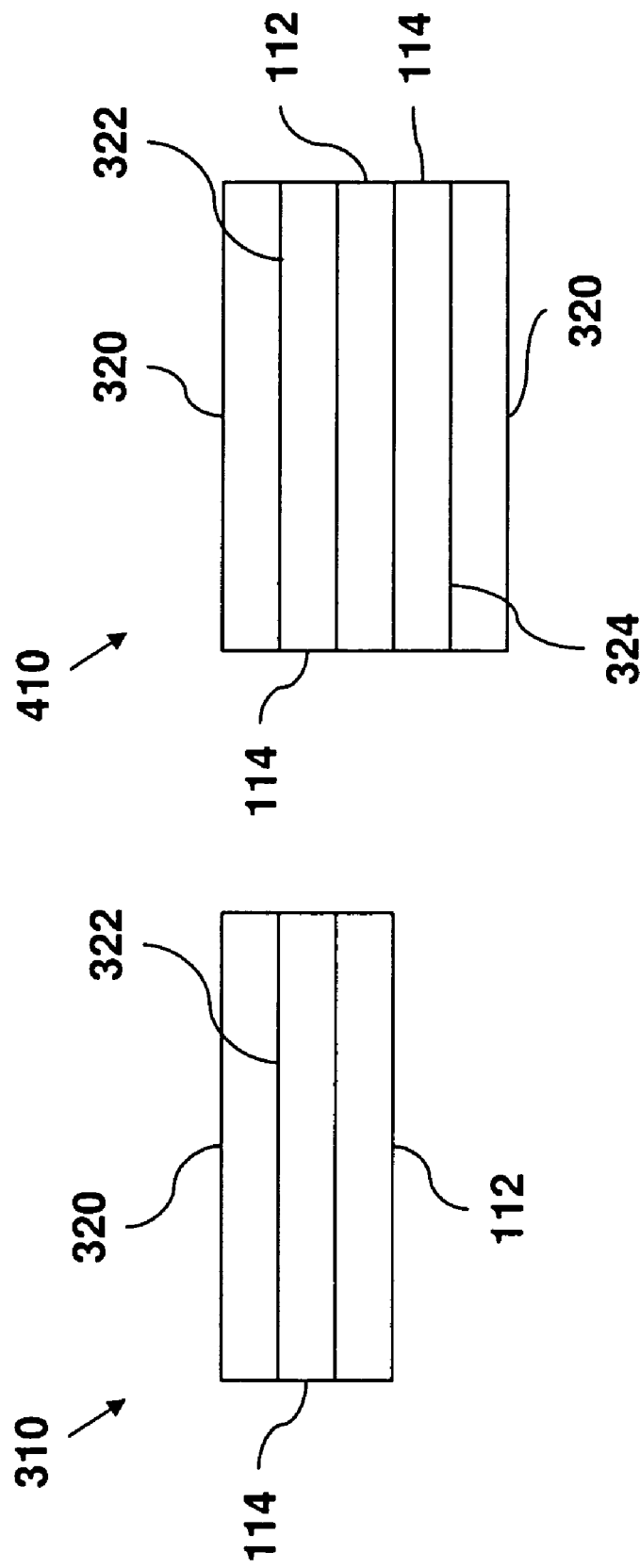

TRANSLUCENT FLAME RETARDANT TAPE

TECHNICAL FIELD

The present application relates to a tape that may incorporate a flame retardant and an adhesive, such as a pressure sensitive adhesive.

BACKGROUND

Pressure sensitive adhesive tapes, available in roll and sheet form, as well as lined and/or self-wound, have been prepared as general purpose tapes and as specialty tapes. These tapes may fulfill a number of application requirements such as clarity, thermal stability, physical requirements, such as puncture resistance, tensile strength, elongation, etc., and dimensional requirements. For example, where optical clarity or adhesive bond longevity are required, acrylic or silicone pressure sensitive adhesives may be used. Where gap-bridging sealing functions and low and high temperature performance may be required one may employ rubber, acrylic or other pressure sensitive adhesive chemistries.

However, it may be necessary to load the adhesives with a number of fillers or additives to reach all of the desired thermal and physical requirements which may render the adhesives non-transparent. Furthermore, in some flame retardant applications it may be desirable to use flame retardant materials or additives that are not halogen or bromine based.

BRIEF DESCRIPTION OF DRAWINGS

Features and advantages of the present invention are set forth herein by description of embodiments consistent with the present invention, which description should be considered in conjunction with the accompanying drawings, wherein:

FIG. 3 is cross-sectional view of another exemplary embodiment of a portion of an adhesive composite consistent with the present invention.

FIG. 4 is cross-sectional view of another exemplary embodiment of a portion of an adhesive composite consistent with the present invention.

DETAILED DESCRIPTION

The present application relates to a tape including an adhesive. In one embodiment, the tape may include a substantially transparent or translucent flame retardant substrate in combination with a pressure sensitive adhesive.

The term "translucent" as used herein shall refer to a characteristic whereby light passes through an object. The light may diffuse through the object and may be scattered when transmitted through the substrate. The term "transparent" as used herein shall refer to a characteristic whereby light may be transmitted through an object without appreciable scattering.

The term "flame retardant" as used herein shall refer to a characteristic whereby the addition of a "flame retardant" to a base material may decrease the combustibility of the base material not incorporating the flame retardant component. Stated in another way, a "flame retardant" may increase the potential of the base material to restrict the propagation or development of flames. The "flame retardant" may also impart fire resistance, which shall be understood herein as the resistance of a material to catch fire, i.e. combust. It should be appreciated that the "flame retardant" characteristics of a material exhibited may differ upon environment and exposure, i.e. heat intensity, degree of exposure, elemental composition of the surrounding air, etc. Furthermore, it should be understood that some materials may inherently exhibit flame retardant characteristics.

Figure 2:
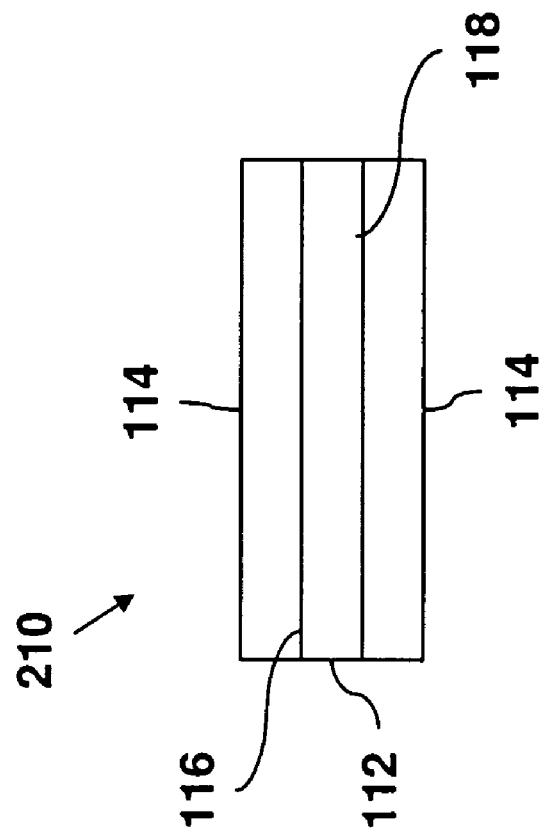
FIG. 2 is a cross-sectional view of another exemplary embodiment of a portion of an adhesive composite consistent with the present invention.
Figure 1:
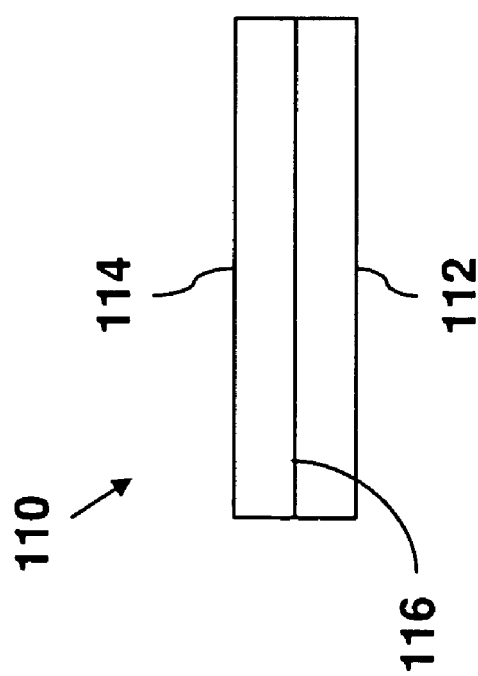
FIG. 1 is a cross-sectional view of one exemplary embodiment of a portion of an adhesive composite consistent with the present invention.

FIGS. 1 and 2 illustrate exemplary embodiments 110, 210 of a tape consistent with the present invention. As shown the tape 110, 210 may include a substrate 112 and a pressure sensitive adhesive 114 coated on the substrate. The pressure sensitive adhesive 114 may coat one side 116 (as depicted in FIG. 1) or both sides 116, 118 (depicted in FIG. 2) of the substrate. FIGS. 3 and 4 illustrate exemplary embodiments 310, 410 of a tape consistent with the present invention including a release liner 320 disposed on the pressure sensitive adhesive 114. The release liner 320 may be disposed on one surface 322 of pressure sensitive adhesive 114 (illustrated in FIG. 3), or may be disposed on both surfaces 322, 324 of the pressure sensitive adhesive 114 where the pressure sensitive adhesive 114 coats both surfaces of the substrate 112 (illustrated in FIG. 4).

The substrate may include a thermoplastic, thermoset or elastomeric polymeric material. In one embodiment, the polymeric material may be a block copolymer and may be prepared from combinations of a polyol, such as polyester or a polyether, and terminated with a functional group suitable to react with diisocyanates (e.g., hydroxyl, amine or carboxyl functionality), an aliphatic or aromatic diisocyanate, and/or a chain extender, such as a short chain diol or amine or a polyfunctional aziridine. The polyether or polyester may contain aliphatic or aromatic type units. Accordingly, the polyurethane so formed may include aromatic urethanes repeat units or aliphatic urethane repeat unit, along with either aromatic based or aliphatic based polyol segments.

In another exemplary embodiment, the polymeric material may be a non-urethane material, such as a polyester, polyvinylchloride, or polyimide film material (e.g. KAPTON®), or a polyetherimide (ULTEM®). Furthermore, the material may include a blend of one or more of the materials described herein.

The substrate may include a substantially translucent polymeric material. For example, the material may include a clear polyurethane film available from Noveon under the trademark ESTANE®. The polymeric material may include a flame retardant additive, or may be inherently flame retardant. With respect to an inherently flame retardant polymer the flame retardant performance may be due to a chemical group within the polymer chain that exhibits flame retardant characteristics. One example of a flame retardant polymeric material suitable for use as a substrate may be available from Huntsman polyurethanes under the trademark IROGRAN™.

In another embodiment, the substrate may include a combination of polymeric materials such as a flame retardant polymer material and a substantially clear polymer material. The clear polymer material therefore itself may not contain any flame retardant additive. By way of example, the substrate may include a combination of a flame retardant polyurethane and a clear or translucent polyurethane to provide a substantially transparent, flame retardant substrate. In one embodiment, the polyurethane may be present between 10-25% and any increment therebetween including 15%, 20%, etc. and the flame retardant polyurethane may be present between 75-90% and any increment therebetween including 80%, 85%, etc. The substrate may be free of flame retardants such as antimony, halogens, bromines and combinations thereof. Such polymer material may be available from Worthen Industries of Nashua, N.H. and described as a fire retardant polyether and/or polyester urethane film product.

In the event that a flame retardant may be incorporated or added to the polymeric material, the flame retardant may include, for example, any of a variety of phosphate materials or combinations thereof, such as phosphate esters, or inorganic phosphates. The flame retardant may also include antimony oxides, magnesium hydroxide, and/or molybdenum compounds.

The polymeric material may include a plasticizer that may also provide flame retardant performance. The flame retardant plasticizer may therefore be a phosphate material such as tri-m-cresyl phosphate. A suitable substrate may include plasticizer in combination with the polymeric materials disclosed above. The plasticizer may be present between 5-30% and any increment therebetween including 15%, 20% etc. and the polymer material may be present between 70-95% and any increment therebetween including 80%, 85%, etc.

Furthermore, a combination of polymeric materials may be compounded to form a polymer blend. A polymer material or a polymer blend may be formed into a substrate through a number of conversion methods such as casting or melt processing, including extrusion, calendaring, blown film extrusion, etc.

The substrate may carry an adhesive polymer, which may be a pressure sensitive adhesive. The term "pressure sensitive adhesive" (PSA) as used herein shall refer to a chemical compound that upon application of pressure may initially adhere to a selected substrate surface. The adhesive may include a thermoplastic compound or thermoset compound such as a crosslinked compound. A thermoset adhesive may be a single part or a two part compound. Furthermore, an adhesive may be applied to the substrate by spray, brush, extrusion, or by coating that may include methods such as extrusion coating, transfer coating, direct knife coating, reverse roll coating, zone coating, screen coating, gravure or calendar coating.

In one embodiment, the adhesive may include an acrylic. The acrylic may be provided in an organic solvent medium such a heptane, toluene, ethyl acetate or even an alcohol based solvent, such as isopropanol or acetone. The acrylic based adhesive may have a Brookfield Viscosity of between 2,000 and 15,000 centipoise at 25 degrees C. and any increment therebetween including 2,500 centipoise, 3,000 centipoise, etc. One example of a useful acrylic may be obtained from Ashland Chemical, Dublin, Ohio, under the trademark AROSET™. The acrylic may also be obtained from National Starch, under the trademarks of PETAFLEX®, DUROTAK® and NACOR®. In the context of the present invention it is understood than any polymer formed from monomers of the following general structure may serve as the polymer component in the acrylic material:

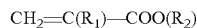

$CH_2=C(R_1)-COO(R_2)$ wherein $R_1$ may be a hydrogen or an alkyl or aromatic group, and $R_2$ may be an alkyl or aromatic type moiety. The acrylic based adhesive may also include other components that may contribute to the adhesive nature of the polymer formed, such as tackifiers and other suitable additives, such as antioxidants and oils. Accordingly, the types of monomers that may be used to prepare the pressure sensitive adhesive may comprise one or more esters of acrylic or methacrylic acid which contain 1-20 carbon atoms in the alkoxy moiety.

The acrylic monomer may contain another copolymerizable monomer which contains an ethylenically unsaturated linkage. For example, the acrylic monomer may contain a vinyl ester of a saturated carboxylic acid such as vinyl acetate. Another type of monomer that may be employed may provide crosslinking sites. This may include, for example, a vinyl monomer containing a carboxylic acid or carbamate functionality which may provide crosslinking reactions with a metal chelate.

The crosslinking reaction may be particularly facilitated by the use of selected additives which may provide catalytic or accelerating effect. The additives may include a metal acetylacetonates, such as chromium (III) acetylacetonate, manganese (III) acetylacetonate, ferric (iron III) acetylacetonate, zinc (II) acetylacetonate, aluminum (III) acetylacetonate, sodium (I) acetylacetonate, uranyl (VI) acetylacetonate and/or mixtures thereof, acting as a latent accelerator. The selective additives may be incorporated into the adhesive composition between 0.1%-5.0% by weight and any value or increment therebetween. For example, the metal acetylacetonate may be present at levels of about 0.5-4.0% by weight, and 0.75%-3.0% by weight, or at levels of about 0.50%, 0.60%, 0.70%, 0.80%, 0.90%, etc.

An acrylic based system consistent with the present invention may include a crosslinkable acrylic polymer that cures upon introduction of heat and may include the removal of solvent. Such polymer may therefore have a Brookfield Viscosity, as noted above, of between 2000-15000 cps. For example, heating between room temperature (25 C.) and about 125 degrees C., including all ranges and temperatures therebetween, may herein provoke the crosslinking reaction and accompanying solvent removal and thereby cure the acrylic polymer into a crosslinked final polymer network. After cure, the acrylic polymer network may have a 180 degree peel strength of between 18.27N/100 mm-137N/100 mm, according to testing standard PSTC-101, incorporated herein by reference and available from the Pressure Sensitive Tape Council, Northbrook, Ill.

In one embodiment, the acrylic adhesive may include a flame retardant. The flame retardant may be a phosphate based flame retardant. The term "phosphate based flame retardant" as used herein refers to a phosphorous-containing compound, e.g. 1,3-dichloro-2-propanol phosphate (3:1), a non-halogenated flame retardant or non-bromated flame retardant. The level of flame retardant may be between 0.1-5.0%, including all values and increments therebetween including 0.5%, 2.0%, etc.

The adhesive film composite, including the substrate in combination with pressure sensitive adhesive, may have an average minimum thickness of between 0.15 mm to 1.0 mm and all increments therebetween. The adhesive film composite may also have an elongation measured by ASTM D 3759 of between 500% and 1,000%, including all increments therebetween such as 550%, 800%, 775%, etc. and tensile strength of between 3,500 N to 9,000 N and any increment therebetween including 4,000 N, 6,000N, 8,100 N, etc. ASTM D 3759 may be obtained from ASTM International, West Conshohocken, Pa., and is incorporated herein by reference.

The adhesive film composite may also have a 180 degree peel strength measured by ASTM D 903 of between 150 grams per centimeter of width to 900 grams per centimeter of width at room temperature and all incremental values therebetween including 175 grams per centimeter, 212 grams per centimeter, 223 grams per centimeter etc. The adhesive film composite may also have a 180 degree peel strength at approximately 70 degrees Celsius of between 500 grams per centimeter of width to 1500 grams per centimeter of width and all incremental values therebetween including 598 grams per centimeter, 625 grams per centimeter, etc. At approximately 48 degrees Celcius and a relative humidity of approximately 95% the adhesive composite may have a 180 degree peel strength of between 175 grams per centimeter of width to 900 grams per centimeter of width including all incremental values therebetween including 298 grams per centimeter, 775 grams per centimeter, etc. ASTM D 903 may be obtained from ASTM International, West Conshohocken, Pa., and is incorporated herein by reference.

The adhesive film composite may have a water vapor transmission rate of approximately between 0.005 grams/cm to 0.01 grams/cm measured by ASTM D 3833, which may be obtained from ASTM International, West Conshohocken, Pa., and is incorporated herein by reference. A moisture absorption rate may be between 0.4% to 1.0% weight gain and any increment therebetween. Furthermore, puncture resistance, may be approximately between 75 Newtons to 200 Newtons. Accordingly, the present invention may meet the Boeing Material Specification BMS 8-346A for Type I or Type II materials, rev. Jun. 11, 2002, which is published by Boeing Company, Seattle, Wash. and is incorporated herein by reference.

The flammability of the adhesive film composite may comply with the BSS 7230 testing standard Method F2 (12 seconds vertical), which is published by Boeing Company, Seattle, Wash. and is incorporated herein by reference. Consistent with the BSS 7230 testing standard Method F2, the adhesive film composite may have a maximum extinguishing time of between 0 to 15 seconds and any increment therebetween including 1, 12, etc. The extinguishing time may be the total time, in seconds, that the test specimen continues to burn with a flame after removal of the ignition source, not including surface burning that results in glowing or smoldering but not flame.

The adhesive film composite may have a maximum average burn length of between 15-20 centimeters including any increment therebetween. The maximum average burn length may be the distance from the original specimen edge to the farthest point showing evidence of damage due to that area's combustion, including areas of partial consumption, charring, or embrittlement. However, this may not include areas sooted, stained, warped, or discolored or areas where material has shrunk or melted away from the heat.

The adhesive film composite may also have a drip extinguishing time of between 3 to 5 seconds and any increment therebetween including 1, 4, etc. The drip extinguishing time may be the time in seconds that any flaming material continues to flame after falling from the test specimen to the floor of the test chamber. Where there is more than one drip, extinguishing time may be reported of the longest flaming drip and if earlier drips are reignited by succeeding drips the measure may be the total of all flaming drips.

Furthermore, the present invention may relate to the use of the adhesive film composite described herein in a number of applications or surfaces. For example, the adhesive film composite herein may be utilized in aeronautical applications such as aeronautical and/or airplane environments or devices. The adhesive film composite herein may also be used as a moisture barrier, in floor panel joint protection, galleys, floor membranes, automotive applications, securing wire or wires, reinforcing rivets, seaming tape and lead edge protection. A method may also be provided allowing for the application of the adhesive film composites described herein, wherein the adhesive film composite may be applied to a selected surface.

Thus according to one aspect, there is provided an adhesive film composite that may include a translucent, flame retardant urethane based substrate; and an adhesive disposed on the substrate.

According to another aspect, there is provided an adhesive film composite suitable for use in aeronautical applications that may include a translucent, flame retardant urethane based substrate; and an adhesive polymer disposed on the substrate, wherein the adhesive film composite complies with the requirements of BSS 7230 Method F2.

According to a further aspect, there is provided an adhesive film composite that may include a substrate; and an adhesive polymer including a phosphate-based flame retardant disposed on the substrate.

According to another aspect, there is provided a method of forming flame retardant material comprising providing a translucent, flame retardant polyurethane; providing a polymer comprising a phosphate-based flame-retardant disposed on the polyurethane; and crosslinking the polymer on the polyurethane wherein the crosslinked polymer when contacting a surface provides a PSTC-101 180 degree peel adhesion of between about 18N/100 mm-137N/100 mm.

According to another aspect, there is provided a method of covering a surface in an aeronautical device comprising providing an adhesive film composite that includes a translucent, flame retardant polyurethane and a polymer disposed on said polyurethane, wherein said adhesive film composite complies with the requirements of BSS 7230 Method F2. The adhesive film composite may then be applied to surfaces of an aeronautical device.

The foregoing description is provided to illustrate and explain the present invention. However, the description hereinabove should not be considered to limit the scope of the invention set forth in the claims appended here to.

What is claimed is:

1. An adhesive film composite comprising:
   a substrate free of materials selected from the group consisting of antimony, halogens, bromines and combinations thereof; and
   an adhesive polymer comprising a non-halogenated phosphate-based flame retardant, disposed on said substrate.

2. The adhesive film composite of claim 1, wherein said adhesive polymer further comprises an acrylic polymer.

3. The adhesive film composite of claim 2, wherein said acrylic polymer includes a flame retardant platicizer.

4. The adhesive film composite of claim 1, wherein said adhesive polymer further comprises a metal acetylacetonate.

5. The adhesive film composite of claim 4, wherein said metal acetylacetonate comprises aluminum acetylacetonate.

6. The adhesive film composite of claim 1, wherein said adhesive film composite comprises a maximum average burn extinguishing time of 15 seconds, a maximum average burn length of 8 inches and a maximum average drip extinguishing time of 5 seconds.

7. The adhesive film composite of claim 1, wherein said adhesive film composite comprises a water vapor transmission rate of approximately between 0.005 grams/cm to 0.01 grams/cm, a moisture absorption rate between 0.4% to 1.0% weight gain and, a puncture resistance between approximately 75 Newtons to 200 Newtons.

8. The adhesive film composite of claim 1, further comprising a release liner disposed on said adhesive polymer.

9. The adhesive film composite of claim 1, wherein said substrate comprises a material selected from the group consisting of polyester, polyurethane, polyvinylchloride, polyimide and combinations thereof.

10. The adhesive film composite of claim 9, wherein said polyurethane is selected from the group consisting of polyether, polyester polyurethane and combinations thereof.

11. The adhesive film composite of claim 1, wherein said substrate comprises a translucent polyurethane material and a flame retardant polyurethane material.

12. The adhesive film composite of claim 1, wherein said substrate is transparent.

13. The adhesive film composite of claim 1, wherein said substrate comprises a flame retardant.

14. The adhesive film composite of claim 13, wherein said flame retardant comprises an additive.

15. The adhesive film composite of claim 13, wherein said flame retardant is incorporated into said adhesive polymer chain.

16. The adhesive film composite of claim 13, wherein said flame retardant is selected from the group consisting of phosphate materials, antimony oxides, magnesium hydroxide, molybdenum compounds and combinations thereof.

17. The adhesive film composite of claim 1, wherein said adhesive film composite is capable of being applied in an application selected from the group consisting of aeronautical, automotive, galley, flooring and combinations thereof.

18. The adhesive film composite of claim 1, wherein said adhesive film composite is used in an application selected from the group consisting of securing wire, reinforcing rivets, seaming tape and lead edge protection.

19. An adhesive film composite comprising:
a translucent, flame retardant urethane-based substrate, wherein said translucent, flame retardant urethane based-substrate is free of materials selected from the group consisting of antimony, halogens, bromines and combinations thereof; and
an adhesive disposed on said substrate comprising a non-bromated phosphate-based flame retardant.

20. An adhesive film composite of claim 19, wherein said adhesive comprises an acrylic polymer.

21. The adhesive film composite of claim 19, wherein said adhesive comprises a metal acetylacetonate.

22. The adhesive film composite of claim 21, wherein said metal acetylacetonate comprises aluminum acetylacetonate.

23. The adhesive film composite of claim 22, wherein said adhesive contains said aluminum acetylacetone between 0.1%-5.0% by weight of said adhesive.

24. The adhesive film composite of claim 19, wherein said phosphate-based flame retardant comprises 1,3-dichloro-2-propanol phosphate (3:1).

25. The adhesive film composite of claim 24, wherein said adhesive contains said 1,3-dichloro-2-propanol phosphate (3:1) between 01.%-5.0% by weight of said adhesive.

26. The adhesive film composite of claim 19, wherein said adhesive film composite comprises a maximum average burn extinguishing time of 15 seconds, a maximum average burn length of 8 inches and a maximum average drip extinguishing time of 5 seconds.

27. The adhesive film composite of claim 19, wherein said adhesive film composite comprises a water vapor transmission rate of approximately between 0.005 grams/cm to 0.01 grams/cm, a moisture absorption rate between 0.4% to 1.0% weight gain and, a puncture resistance between approximately 75 Newtons to 200 Newtons.

28. The adhesive film composite of claim 19, further comprising a release liner disposed on said adhesive.

29. The adhesive film composite of claim 19, wherein said substrate has a first surface and a second surface and said adhesive is disposed on said first surface and said second surface.

30. The adhesive film composite of claim 19, wherein said adhesive film composite has a tensile strength of approximately 3,500 N to 9,000 N.

31. The adhesive film composite of claim 19, wherein said adhesive film composite has an elongation between 500% to 1,000%.

32. The adhesive film composite of claim 19, wherein said adhesive film composite has a 180 degree peel strength of between 18.27 N/100 mm to 137N/100 mm of width at room temperature.

33. An adhesive film composite suitable for use in aeronautical applications comprising:
a translucent, flame retardant urethane based substrate; and
an adhesive polymer disposed on said substrate;
wherein said translucent, flame retardant urethane based-substrate is free of materials selected from the group consisting of antimony, halogens, bromines and combinations thereof;
wherein said adhesive polymer comprises an acrylic polymer and a non-bromated phosphate-based flame retardant; and
wherein said adhesive film composite comprises a maximum average burn extinguishing time of 15 seconds, a maximum average burn length of 8 inches and a maximum average drip extinguishing time of 5 seconds.

34. The adhesive film composite of claim 33, wherein said adhesive polymer comprises a metal acetylacetonate.

35. The adhesive film composite of claim 34, wherein said metal acetylacetonate comprises aluminum acetylacetonate.

36. The adhesive film composite of claim 33, wherein said phosphate-based flame retardant comprises, 1,3-dichloro-2-propanol phosphate (3:1).

* * * * *